(No Model.)
H. J. GILBERT.
SEPARABLE PULLEY.
No. 416,592. Patented Dec. 3, 1889.
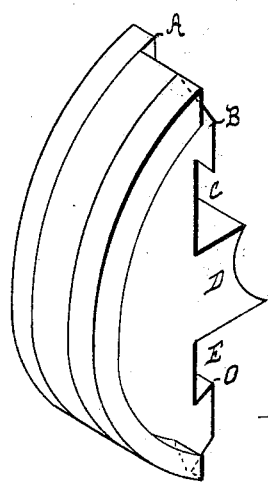
Fig. 1.
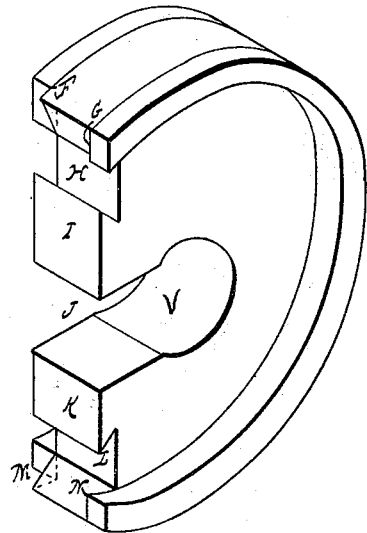
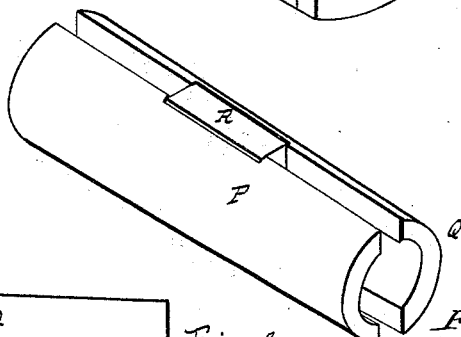
Fig. 2.
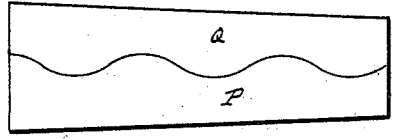
Fig. 3.
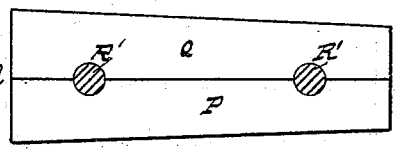
Fig. 5.
Fig. 4.
Witnesses
Adelaide A. Anderson
Geo N Lothrop
Inventor
Henry J. Gilbert

UNITED STATES PATENT OFFICE.

HENRY J. GILBERT, OF SAGINAW, MICHIGAN.

SEPARABLE PULLEY.

SPECIFICATION forming part of Letters Patent No. 416,592, dated December 3, 1889.

Application filed March 7, 1889. Serial No. 302,301. (No model.)

*To all whom it may concern:*

Be it known that I, HENRY J. GILBERT, of Saginaw, in the county of Saginaw and State of Michigan, have invented a new and useful Improvement in Separable Pulleys, of which the following is a specification.

My invention consists in an improvement in separable pulleys, hereinafter fully de-described and claimed.

Figure 1 is a perspective of the two parts of the pulley separated. Fig. 2 is a perspective of the bushing, and Figs. 3, 4, and 5 are side elevations of the bushing, showing modifications in the construction thereof.

In the pulley, V represents the shaft-opening bored on a taper to receive the taper bushing P Q, and an opening J, large enough to receive the shaft, is cut from one side of the shaft-opening out to the line of separation of the two parts of the pulley, this space being filled by a projection D on the other part of the pulley.

Each part of the pulley is provided with joints to interlock with corresponding joints on the other part of the pulley, the dovetail projections I K passing into the grooves C and E and the dovetail projections B O passing into the grooves H and L.

One part of the pulley-rim (G and N in the larger part, Fig. 1) projects beyond the line of separation, while the other part of the rim, F and M, stops short of the line of separation, the rim being correspondingly cut away and projecting on the other part of the pulley, one such projection being shown at A. This form permits the two parts of the pulley to be locked together by sliding in the longitudinal direction of the shaft, and checks the sliding motion, by means of the projecting rims, when the two parts have come fairly together.

The shaft-opening V in the pulley is a taper opening.

After the pulley is placed upon the shaft and the two portions caused to interlock the taper bushings P and Q are placed around the shaft, with their small ends projecting into the larger end of the shaft-opening V, and are then driven home to lock the pulley to the shaft.

Taper bushings are not new *per se*, and the difficulty in their practical use is that if one be driven farther than the other the pulley is thrown out of center on the shaft. I avoid this difficulty by so constructing the two or more parts in which the taper bushing is made that they interlock, and are thereby caused to move together, whichever one be driven.

In Fig. 2 the edges of the taper bushings P and Q are slightly mortised and a block R is fitted in said mortise. The block may be lightly tacked to either one of the bushings, or may be put in loose. When the bushing is made in two parts, I prefer to use two of these blocks. Instead of this construction, the parts P and Q may be made to interlock by being joined on an irregular line, as shown in Fig. 3.

As shown in Fig. 4, the interlocking of the two parts of the bushing is obtained by dowel-pins S, set in holes bored in the edges of the bushing. In Fig. 5 pins R' are set in holes bored equally through the meeting edges of the two parts of the bushing. It is immaterial how the bushing is caused to interlock.

The rim of the pulley comprises the periphery of the main portion or web and the curved pieces, which are glued, nailed, or otherwise attached to the opposite sides of the said main portion or web.

I would have it understood that I do not herein claim the construction shown in an application, Serial No. 289,372, filed by me October 29, 1888.

What I claim as my invention, and desire to secure by Letters Patent, is—

A separable pulley having its web divided on an irregular line extending inward to the shaft-opening and provided along said line with dovetailed interlocking joints, and having its rim irregularly divided on opposite sides of the web, one part of the pulley-rim being extended beyond the main irregular line of separation through the pulley-web, and the other part of the rim being terminated short of said line, substantially as described.

HENRY J. GILBERT.

Witnesses:
ADELAIDE A. ANDERSON,
GEO. H. LOTHROP.